Nov. 25, 1952 R. E. HERSEY 2,619,545

TELEPHONE CALLING LINE IDENTIFICATION AND RECORDING SYSTEM

Filed June 13, 1947 5 Sheets-Sheet 1

INVENTOR
R. E. HERSEY
BY R. Mario
ATTORNEY

Nov. 25, 1952 R. E. HERSEY 2,619,545

TELEPHONE CALLING LINE IDENTIFICATION AND RECORDING SYSTEM

Filed June 13, 1947 5 Sheets-Sheet 2

INVENTOR
R. E. HERSEY
BY R. Mariio
ATTORNEY

Nov. 25, 1952 R. E. HERSEY 2,619,545

TELEPHONE CALLING LINE IDENTIFICATION AND RECORDING SYSTEM

Filed June 13, 1947 5 Sheets-Sheet 3

INVENTOR
R. E. HERSEY
BY R. Marino
ATTORNEY

Nov. 25, 1952 R. E. HERSEY 2,619,545

TELEPHONE CALLING LINE IDENTIFICATION AND RECORDING SYSTEM

Filed June 13, 1947 5 Sheets-Sheet 4

INVENTOR
R. E. HERSEY
BY R. Marino
ATTORNEY

Nov. 25, 1952 R. E. HERSEY 2,619,545

TELEPHONE CALLING LINE IDENTIFICATION AND RECORDING SYSTEM

Filed June 13, 1947 5 Sheets-Sheet 5

INVENTOR
R. E. HERSEY
BY R. Mariano
ATTORNEY

Patented Nov. 25, 1952 2,619,545

UNITED STATES PATENT OFFICE 2,619,545

TELEPHONE CALLING LINE IDENTIFICATION AND RECORDING SYSTEM

Ralph E. Hersey, Madison, N. J., assignor to Bell Telephone Laboratories, Incorporated, New York, N. Y., a corporation of New York Application June 13, 1947, Serial No. 754,489

25 Claims. (Cl. 179—7)

This invention pertains to telephone systems employing equipment of the step-by-step type, and more particularly to systems of said type in which items of call-record information are recorded for billing purposes. In such systems, an essential part of the record of a telephone call is the identification of the calling line from which the subscriber, to whom the charge for the call is to be billed, may be determined. The present invention discloses a novel and convenient means for identifying calling lines in systems of this kind.

A feature of the invention is that it is equally applicable to systems employing line switches and to systems employing line finders.

Another feature of the invention is a means whereby the identifications of calling lines, as determined from their locations on the terminals of the originating switches, may be translated into the directory numbers of said lines.

Still another feature of the invention is a means whereby the identifications of certain lines, such as flat-rate lines, for which records of individual calls are not required, may be used to prevent the production of unnecessary records on calls made from said lines.

These and other features of the invention will be more clearly understood from the accompanying description, the appended claims, and the drawings, in which:

To completely disclose the invention, Fig. 2 should be placed below Fig. 1 and Fig. 4 below Fig. 3.

Figure 1:
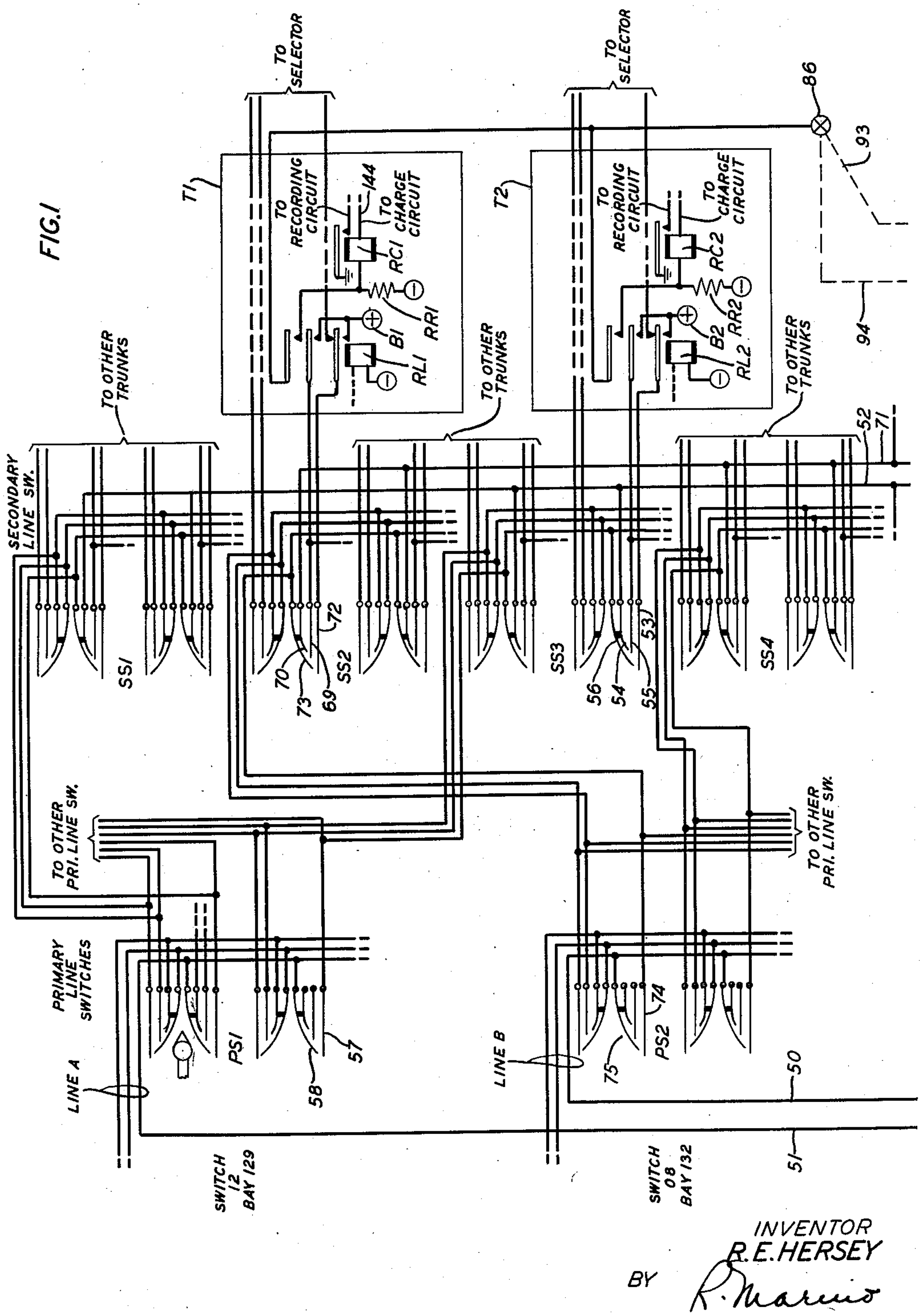
Fig. 1 shows a portion of a telephone system employing line switches.
Figure 2:
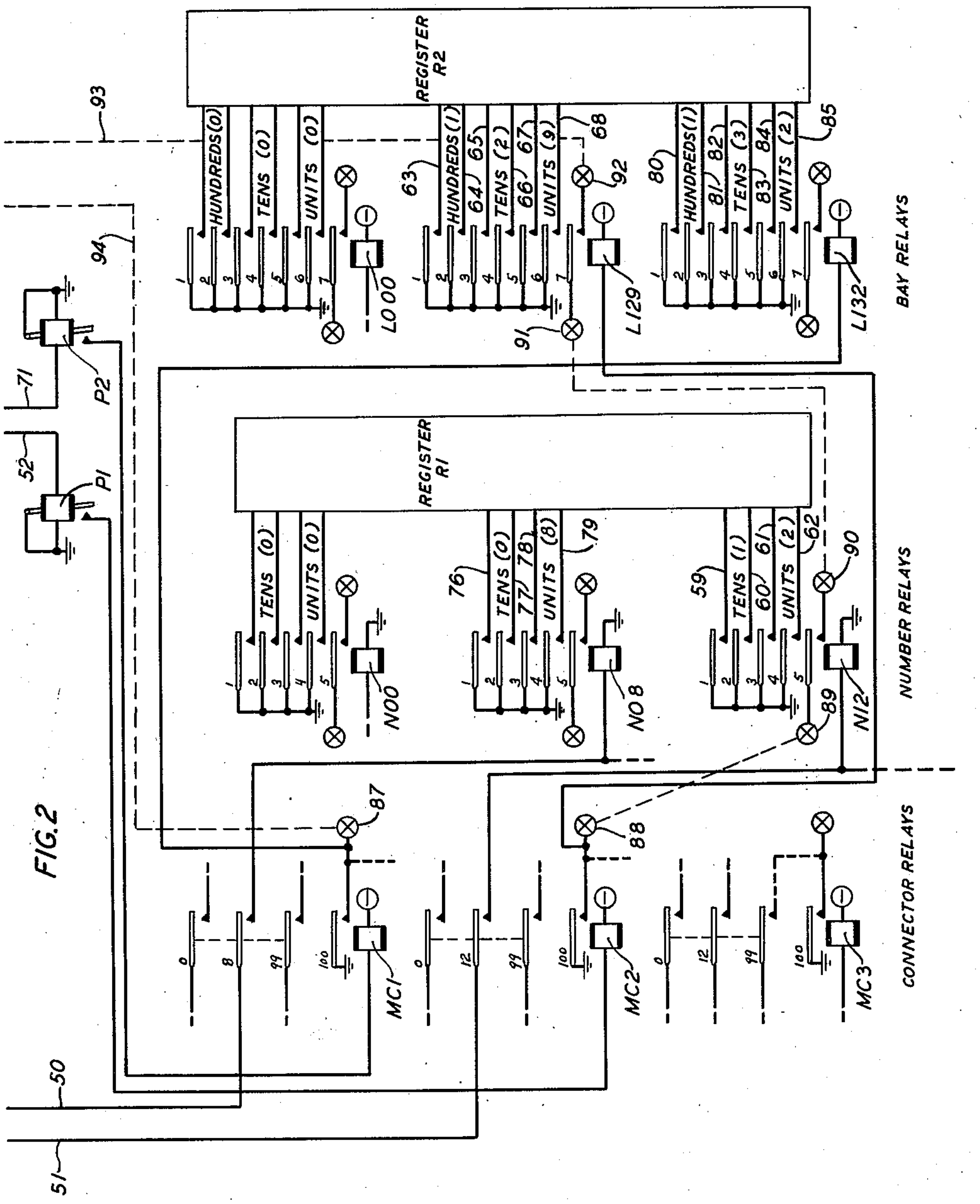
Fig. 2 shows identifying circuits applicable to the system of Fig. 1.

In Fig. 1, each line switch, such as switch PS1 or switch SS1, is represented by two sets of contacts. As is well known, line switches commonly used each have ten sets of contacts, and the line switches employed in the present invention do not differ from those commonly used. However, the two sets of contacts shown for each line switch will serve to demonstrate the construction and operation of the invention. The mechanisms of the line switches and the circuits controlling their operation have also been omitted from the drawings in the interests of clarity, the construction and operation of the parts not shown being well known and not pertinent to the present invention. Reference, however, may be made to any standard text, such as Smith and Campbell's Automatic Telephony for a detailed description of the construction of the switches and the circuits necessary to their operation.

A primary line switch is provided for each line, as is customary in systems of this type. In the drawing, PS1 is the primary line switch for line A and PS2 is the primary line switch for line B. The primary line switches are mounted in the usual manner or numbered bays or sections of framework, each bay having a capacity for one hundred switches, the switches in each bay being consecutively numbered from "00" to "99." Any line can be identified by the number of its primary line switch and the number of the bay in which said switch is located. For example, if primary line switch PS1 is switch No. 12 in bay No. 129, the numbers "12" for the switch and "129" for the bay, identify line A, since this line and no other is associated with the switch so indicated. Likewise, the numbers "08" for the switch and "132" for the bay identify line B, its primary line switch PS2 being assumed to be switch No. 08 located in bay No. 132. Advantage of this fact is taken in the present invention to identify calling lines.

The ten sets of contacts of each primary line switch are each connected to contacts of secondary line switches, such as switches SS1, SS2, etc. which have access to trunks, the corresponding contacts of a number of primary line switches being multiplied together so that the lines which they serve reach secondary line switches over ten paths. This is the customary arrangement in systems of this kind, the lines of the system being then divided into groups with each group having common access to secondary line switches over ten paths.

The number of lines in each group depends upon the density of traffic in said group and may vary from group to group. The primary line switches of a group of lines therefore may or may not all be on the same bay. For example, line A is assumed to be one of a group of lines having access to trunks through secondary line switches SS1, SS3, etc. The contacts of primary line switch PS1 on bay No. 129 are multipled to the contacts of other primary line switches, as indicated, some of which may be on bay No. 129 and others on other bays. Line B is assumed to belong to another group of lines having access to trunks through secondary line switches SS2, SS4, etc. The contacts of primary line switch PS2 on bay No. 132 are similarly multipled to the contacts of other primary line switches which may or may not be on bay No. 132.

In accordance with the present invention, there is provided for each of the groups of lines described above one or more connector relays to the contacts of which the sleeve conductors of all lines in the group are connected. For example, relay MC1 is provided for the group of lines of which line B is one and the sleeve conductor 50 of said line is connected to the No. 8 contacts of said relay. The sleeve conductors of all other lines (not shown) in the same group are similarly connected to other contacts of relay MC1. Relay MC2 is provided for the group of lines of which line A is one and the sleeve conductor 51 of said line is connected to the No. 12 contacts of said relay. The sleeve conductors of all other lines (not shown) in the same group are similarly connected to other contacts of relay MC2. Relay MC3 and other similar relays (not shown) are provided for the other groups of the system. While only one connector relay MC1, MC2, MC3, etc. is shown for each group of lines, it is obvious that two or more similar relays may be provided for each group, their respective windings being connected in parallel, and the sleeve conductors of part of the lines of the group being connected to the contacts of one relay while the sleeve conductors of another part of the lines are connected to contacts of another relay.

Each of said connector relays MC is controlled by a polarized relay, the winding of which is connected to a contact in each set of contacts of each secondary line switch through which the lines of the associated group have access to trunks. For example, relay MC2 is controlled by polarized relay P1, the winding of relay MC2 being connected to the contacts of relay P1, and the winding of relay P1 connected through conductor 52 to a contact in each of the sets of contacts of secondary line switches SS1, SS3, etc. through which the lines of the group which includes line A, have access to trunks. Relay MC1, polarized relay P2, and secondary line switches SS2, SS4, etc. are similarly arranged with respect to the group of lines that includes line B.

For each primary line switch number, a number relay is provided, for example, relay N00 for line switch number "00," relay N08 for line switch number "08," and relay N12 for line switch number "12." The winding of each one of said relays is connected to every contact of a connector relay MC associated with a line whose primary line switch has the number assigned to said number relay N. For example the winding of relay N08 is connected to the No. 8 contacts of relay MC1, said contacts being associated with line B whose primary line switch has the number "08," and the winding of relay N12 is connected to the No. 12 contacts of relay MC2, said contacts being associated with line A whose primary line switch has the number "12." Contacts of the number relays, N00, N08, N12, etc. are connected to a suitable register R1 for registering (in code form if desired) number indications given by the operation of said relays. Registers of the type required are well known in the art and may be constructed, for example, to respond to the grounding of a combination of two out of five conductors for each digit to be registered. However, any suitable form of register may be used, conductors to said register being suitably connected to contacts of the number relays so that operation of any one of said relays will cause registration of the number assigned to said relay.

For each primary line switch bay number, a bay relay is provided, for example, relay L000 for bay number "000," relay L129 for bay number "129," and relay L132 for bay number "132." The winding of each of said relays is connected to a contact of every connector relay MC associated with primary line switches on the bay whose number is that assigned to said bay relay. For example, the winding of relay L132 is connected to the No. 100 contacts of relay MC1, said last-mentioned relay being associated with at least one line, line B, whose primary line switch PS2 is on bay No. 132. Likewise, the winding of relay L129 is connected to the No. 100 contacts of relay MC2, the latter relay being associated with at least one line, line A, whose primary line switch is on bay No. 129. Contacts of the bay relays, L000, L129, L132, etc. are connected to a suitable register R2 which may be similar to register R1 or a part thereof for registering number indications expressed by the operation of said relays.

As is customary in systems of the kind to which the present invention is applicable, each trunk is provided with a charge relay, relay RC1 being the charge relay of trunk T1 and relay RC2 the charge relay of trunk T2. When a trunk, for example, trunk T1, is used for a telephone connection, its charge relay RC1 is operated if the connection is completed, and actuates suitable means by which a record of the call is made for billing purposes. If said relay is not operated, no record of the call is made. The present invention utilizes the charge relays of the trunks to prevent recording on calls made by certain lines, even though the calls are completed. To make this feature available to any line or group of lines, a terminal 86 associated with all of the trunks T1, T2, etc. is provided; a terminal, such as terminal 87 or terminal 88, is associated with each of the connector relays MC1, MC2, MC3, etc.; two terminals, such as terminals 89 and 90, are associated with each of the line switch number relays N00, N08, N12, etc.; and two terminals, such as terminals 91 and 92, are associated with each of the bay number relays L000, L132, L129, etc. Said terminals are arranged so that they may be connected together in any manner desired.

When a call is originated, for example, by line A, primary line switch PS1 operates in the well-known manner, closing, for example, the lower of the two sets of contacts shown for said switch, to extend the conductors of said line to secondary line switch SS3. Said secondary line switch then operates in a similar manner, closing, for example, the lower of the two sets of contacts shown for said switch to extend the connection to trunk T2. Relay RL2 in said trunk is the relay normally provided whose operation in any suitable manner indicates that identification of the calling line is required. Only one such relay in the trunks served by the identifying circuits of Fig. 2 is operated at one time. When said relay operates, a circuit is completed from positive battery B2 through the middle contacts of said relay, contact springs 55 and 54 of secondary line switch SS3, conductor 52, and winding of relay P1 to ground, operating relay P1 which is poled to operate on positive battery only. Relay P1 does not operate until relay RL2 operates since at no other time is positive battery applied to the winding of relay P1. Relay MC2 then operates over an obvious circuit. A circuit is thereby completed from battery B2 through the lower front contacts of relay RL2, contact springs 53 and 56 of secondary line switch SS3, contact springs 57 and 58 of primary line switch PS1, conductor 51, No. 12 contacts of relay MC2, and winding of relay N12 to ground, operating relay N12. Conductors 59 and 60 to the register R1 are thereby grounded through No. 1 and No. 2 contacts of relay N12, respectively, causing said register to register the tens digit "1." The grounding of conductors 61 and 62 through No. 3 and No. 4 contacts of relay N12 also causes register R1 to register the units digit "2." The number "12" is therefore registered and said number is the number of the primary line switch PS1 of line A.

By the operation of relay MC2, an obvious circuit is completed over which relay L129 operates, grounding conductors 63, 64, 65, 66, 67 and 68 to the register R2, causing said register to operate and register the number "129" which is the number of the bay in which primary line switch PS1 is located. The calling line A is therefore identified by the registration of the number of its primary line switch PS1 and the number of the bay in which said switch is located. The registrations in registers R1 and R2 may be used to control a recorder or other device. Release of relay RL2 releases relays P1, MC2, N12 and L129, the latter relays disconnecting ground from the conductors to the registers so that said registers are ready to register the identification of another calling line.

In the same way, when a call is originated by line B, primary line switch PS2 operates, closing, for example, the upper of the two sets of contacts shown for said switch to extend the conductors of said line to secondary line switch SS2, and said secondary line switch operates closing, for example, the upper of the two sets of contacts shown for said switch to extend the connection to trunk T1. When relay RL1, which corresponds to relay RL2 of trunk T2, operates, indicating that identification of the calling line is required, a circuit is completed from positive battery B1 through the middle contacts of said relay, contact springs 69 and 70 of secondary line switch SS2, conductor 71, and winding of polarized relay P2, operating relay P2, thereby operating relay MC1 over an obvious circuit. A circuit is thereby completed from battery B1 through the lower front contacts of relay RL1, contact springs 72 and 73 of secondary line switch SS2, contact springs 74 and 75 of primary line switch PS2, conductor 50, No. 8 contacts of relay MC1, and winding of relay N08 to ground, operating relay N08. Conductors 76, 77, 78 and 79 to the register R1 are thereby grounded, causing said register to register the number "08." Relay L132 also operates over an obvious circuit, grounding conductors 80, 81, 82, 83, 84 and 85 to the register R2, causing said register to operate and register the number "132." The calling line B is therefore identified by the registration of the numbers "08" and "132" which are, respectively, the number of primary line switch PS2 and the number of the bay in which said switch is located.

When the connection of line B through trunk T1 to the called line is completed in the usual manner and the called line answers, the charge relay RC1 of trunk T1 will normally be operated by the grounding of conductor 144 in the charge circuit of said trunk, thereby causing the call to be recorded. However, if terminal 86 is connected to terminal 87 as shown by the broken line 94, then when relay RL1 operates and, in consequence, relay MC1 operates, as described above, a circuit is completed from resistance RR1 through the upper contacts of relay RL1, terminal 86, the conductor represented by the broken line 94, and the No. 100 contacts of relay MC1 to ground, which short-circuits the winding of charge relay RC1, preventing said relay from operating and thereby preventing the recording. On a call originated by any line associated with relay MC1, said relay will also be operated and operation of the charge relay of the trunk used will be prevented, in the manner described above for relay RC1, thereby preventing recording on said call. Flat-rate lines may, therefore, be connected to the primary line switches associated with relay MC1 and calls made by them will not be recorded.

If, however, it is desired to omit recording on calls made by a particular line only, as, for example, line A, then terminal 88 is connected to terminal 89, terminal 90 to terminal 91, and terminal 92 to terminal 86, as indicated by broken lines. Then, on a call originated by line A, when relays RL2, MC2, N12, and L129 operate, as previously described, a circuit is completed from resistance RR2 through the upper contacts of relay RL2, terminal 86, the conductor indicated by the broken line 93, No. 7 contacts of relay L129, the connection between terminals 91 and 90, No. 5 contacts of relay N12, the connection between terminals 89 and 88, and No. 100 contacts of relay MC2 to ground, which short-circuits the winding of relay RC2. Said relay is thereby prevented from operating and said call is, in consequence, not recorded. Recording is not prevented on calls from other lines since on none of said calls is the particular combination of relays MC2, N12, and L129 operated.

It will be observed, in the above example, that by connecting terminal 91 to ground, recording will be prevented on calls from all lines whose primary line switches are located on bay No. 129 since, on all such calls, relay L129 will be operated and will prevent the operation of the charge relay. By connecting terminal 90 to terminal 86 recording will be prevented on calls from all lines whose primary line switches have the number "12" since, on all such calls, relays MC2 and N12 will be operated, preventing the operation of the charge relay. Thus, by suitable connection of the terminals provided, recording may be prevented on calls from all lines in one or more groups, on calls from lines whose primary line switches have one or more particular numbers, or on calls from one or more particular lines, or any combination thereof.

Figure 3:
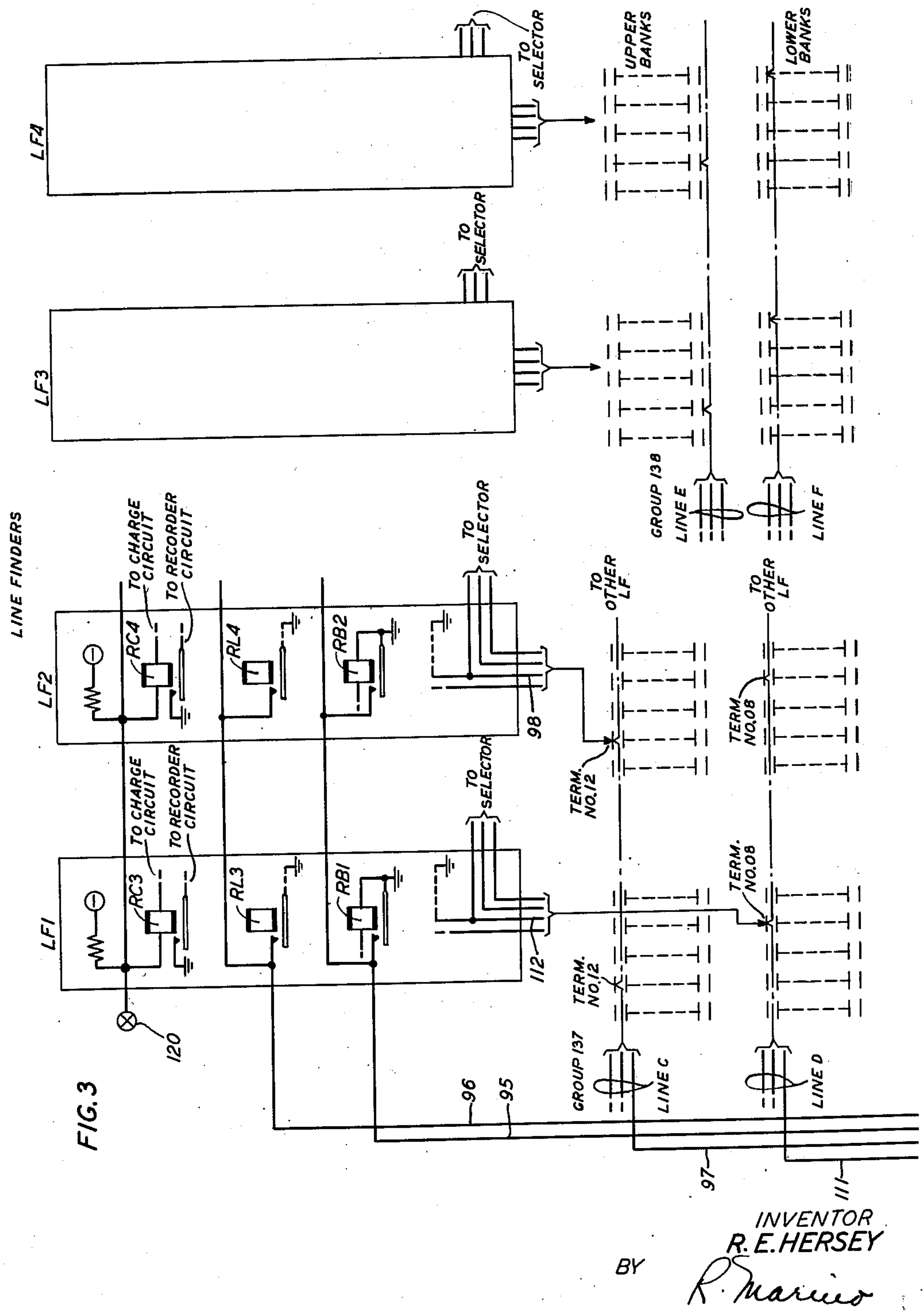
Fig. 3 shows a portion of a telephone system employing line finders.
Figure 4:
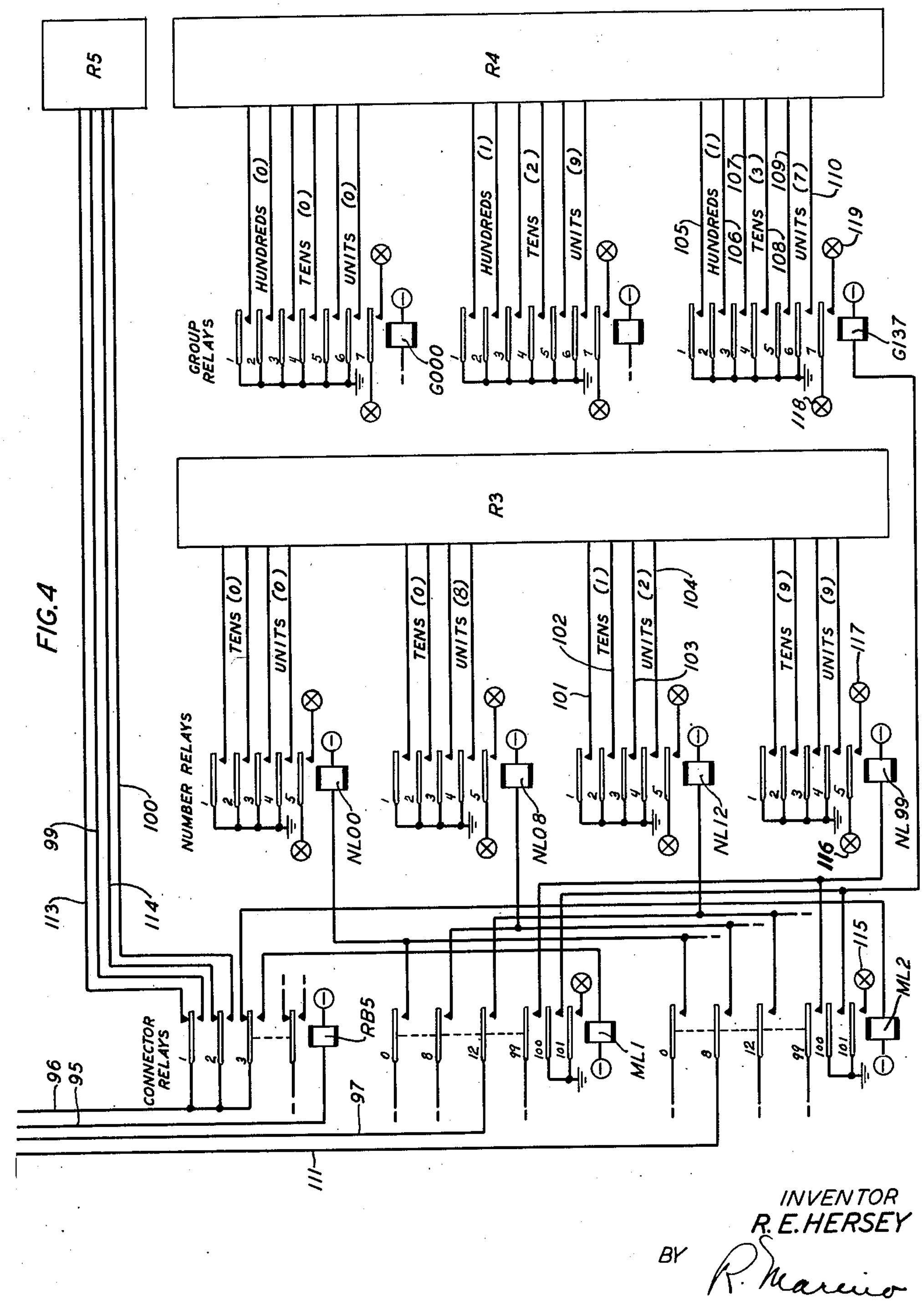
Fig. 4 shows identifying circuits applicable to the system of Fig. 3.

Fig. 3 shows diagrammatically the arrangement of a telephone system employing line finders, and Fig. 4 shows the circuits required to apply the invention to a system of this type. Each line finder, such as line finder LF1 or LF3 in Fig. 3, has an upper and a lower bank each containing one hundred sets of terminals consecutively numbered from "00" to "99." To each set of terminals of a line finder, a line is connected and multipled to correspondingly numbered sets of terminals in other line finders. For example, line C is connected to the No. 12 terminals of the upper bank of line finder LF1 and multipled to the No. 12 terminals of line finder LF2 and to like-numbered terminals in other line finders not shown. Line D is connected to the No. 08 terminals of the lower bank of line finder LF1 and multipled to the No. 08 terminals of line finder LF2 and other line finders in the same manner as line C. The number of line finders thus multipled together is dependent upon the density of traffic. Lines E and F are similarly connected and multipled with respect to line finders LF3, LF4, and other line finders not shown. The line finders are, therefore, divided into groups, line finders LF1, LF2, etc., for example, forming one group and line finders LF3, LF4, etc. forming another group. Said groups may be designated by numbers. Any line of the system may then be identified by the number of the group of line finders with which it is associated, the number of the line finder terminals to which it is connected, and the banks, upper or lower, in which said terminals are located. The present invention utilizes these characteristics of the system to identify calling lines.

In accordance with the usual practice in systems of this kind, the circuit of each line finder comprises a relay, RB1 or RB2, which operates when the associated line finder extends the connection of a calling line from terminals in an upper bank but does not operate when the line finder extends a calling line through terminals in a lower bank. The circuit of each line finder also comprises a relay, RL3, or RL4, which operates when identification of the calling line is required, and a charge relay, RC3 or RC4, which, when operated in connection with a telephone call, causes said call to be recorded. Relays RL3 and RL4 correspond to relays RL1 and RL2 and relays RC3 and RC4 to relays RC1 and RC2 of Fig. 1. As in the previously-described system (Figs. 1 and 2), only one of the relays RL3 or RL4 is operated for identification of a calling line at one time.

In accordance with the present invention, two connector relays are provided for each group of line finders, one of said relays being provided for lines connected to terminals in the upper banks of the line finders and the other for lines connected to terminals in the lower banks of said line finders. Relay ML1 is the connector relay for lines having terminals in the upper bank of line finders LF1, LF2, etc. and relay ML2 the connector relay for lines having terminals in the lower bank of said line finders. To the contacts of the connector relays, the sleeve conductors of associated lines are connected in a manner similar to that described for relays MC1 and MC2 of Fig. 2, to which relays ML1 and ML2 correspond. For each line finder terminal number, a number relay NL00, NL08, or NL12, is provided which corresponds to relay N00, N08, or N12 of Fig. 2 and is similarly connected to contacts of the connector relays and to a suitable register R3, which may be similar to register R1. For each group of line finders, a group relay is provided. Relay G000 is the group relay for group No. 000 and relay G137 the group relay for group No. 137. These relays correspond to the bay relays of Fig. 2 and are similarly connected to contacts of the connector relays and to a suitable register R4 which may be similar to register R2 or a part thereof. However, the purpose of these relays is to indicate line-finder group numbers rather than bay numbers. An additional relay RB5 is provided to indicate the bank in which the terminals of a calling line are located. Contacts of this relay are connected to a suitable register R5 to register, for example, the digit "0" for a lower bank and the digit "1" for an upper bank. Register R5 may be similar to register R2 or a part thereof.

When a call is originated, for example, by line C, one of the line finders having access to said line, for example, line finder LF2, operates in the well-known manner to extend the conductors of said line. Since the terminals of line C are in the upper bank of line finders LF1, LF2, etc., relay RB2 operates, completing a circuit from battery through the winding of relay RB5, conductor 95, and contacts of relay RB2 to ground, over which relay RB5 operates. When relay RL4 operates, indicating that identification of the calling line is required, relay ML1 operates over a circuit extending from battery through the winding of said relay, No. 3 front contacts of relay RB5, conductor 96, and contacts of relay RL4 to ground. A circuit is thereby completed from battery through the winding of relay NL12, No. 12 contacts of relay ML1, sleeve conductor 97 of line C, terminals and brush of line finder LF2, and conductor 98 to ground in the circuit of line finder LF2, over which relay NL12 operates. Relay G137 also operates over an obvious circuit through No. 100 contacts of relay ML1. By the operation of relay RB5, conductors 99 and 100 to the register R5 are grounded through contacts of relay RL4, conductor 96, and No. 1 and No. 2 front contacts of relay RB5, respectively, causing said register to register the digit "1." By the operation of relay NL12, conductors 101 and 102 to the register R3 are grounded through No. 1 and No. 2 contacts of relay NL12, respectively, causing said register to register the tens digit "1," and conductors 103 and 104 are grounded through No. 3 and No. 4 contacts of relay NL12, respectively, causing register R3 to register the units digit "2." By the operation of relay G137, conductors 105, 106, 107, 108, 109 and 110 are grounded, causing register R4 to register the number "137." The calling line C is therefore identified by the registration of number "137" in register R4, the number "12" in register R3, and the digit "1" in register R5, indicating that said line is in group No. 137 and is the line connected to line finder terminals No. 12 in the upper banks of the line finders of said group.

If a call is originated by line D and line finder LF1 responds, extending the conductors of said line, relay RB1 does not operate since the terminals of said line are in the lower banks of line finders LF1, LF2, etc. Relay RB5 therefore does not operate. When relay RL3 operates, indicating that identification of the calling line is required, relay ML2 operates over a circuit extending from battery through the winding of said relay, No. 3 back contacts of relay RB5, conductor 96 and contacts of relay RL3 to ground. A circuit is thereby completed from battery through the winding of relay NL08, No. 8 contacts of relay ML2, sleeve conductor 111 of line D, terminals and brush of line finder LF1, and conductor 112 to ground in the circuit of line finder LF1, over which relay NL08 operates. Relay G137 also operates over an obvious circuit through No. 100 contacts of relay ML2. By the operation of relay RL3, conductors 113 and 114 to the register R5 are grounded through contacts of relay RL3 and No. 1 and No. 2 back contacts of relay RB5, respectively, causing said register to register the digit "0." The operation of relay NL08 grounds conductors to the register R3 to register the tens digit "0" and the units digit "8" and the operation of relay G137 causes the registration of the number "137" in register R4 as described above. The calling line D is therefore identified as the line in group No. 137 connected to terminals No. 08 of the lower banks of the line finders of said group.

A terminal 120 is associated with the charge relays RC3, RC4, etc.; a terminal, such as terminal 115, is provided for each of the connector relays ML1, ML2, etc.; two terminals, such as terminals 116 and 117 are provided for each of the number relays NL00, NL08, NL99, etc.; and two terminals, such as terminals 118 and 119, are provided for each of the group relays G000, G137, etc. These terminals may be connected together in a similar manner to the connections described above for the circuits shown in Figs. 1 and 2 and with similar results. It is obvious that by suitable cross-connection of said terminals, as previously described, recording may be prevented on calls from lines in one or more groups, on calls from lines connected to terminals of particular banks of line finders, on calls from one or more particular lines, or in various combinations thereof.

Figure 5:
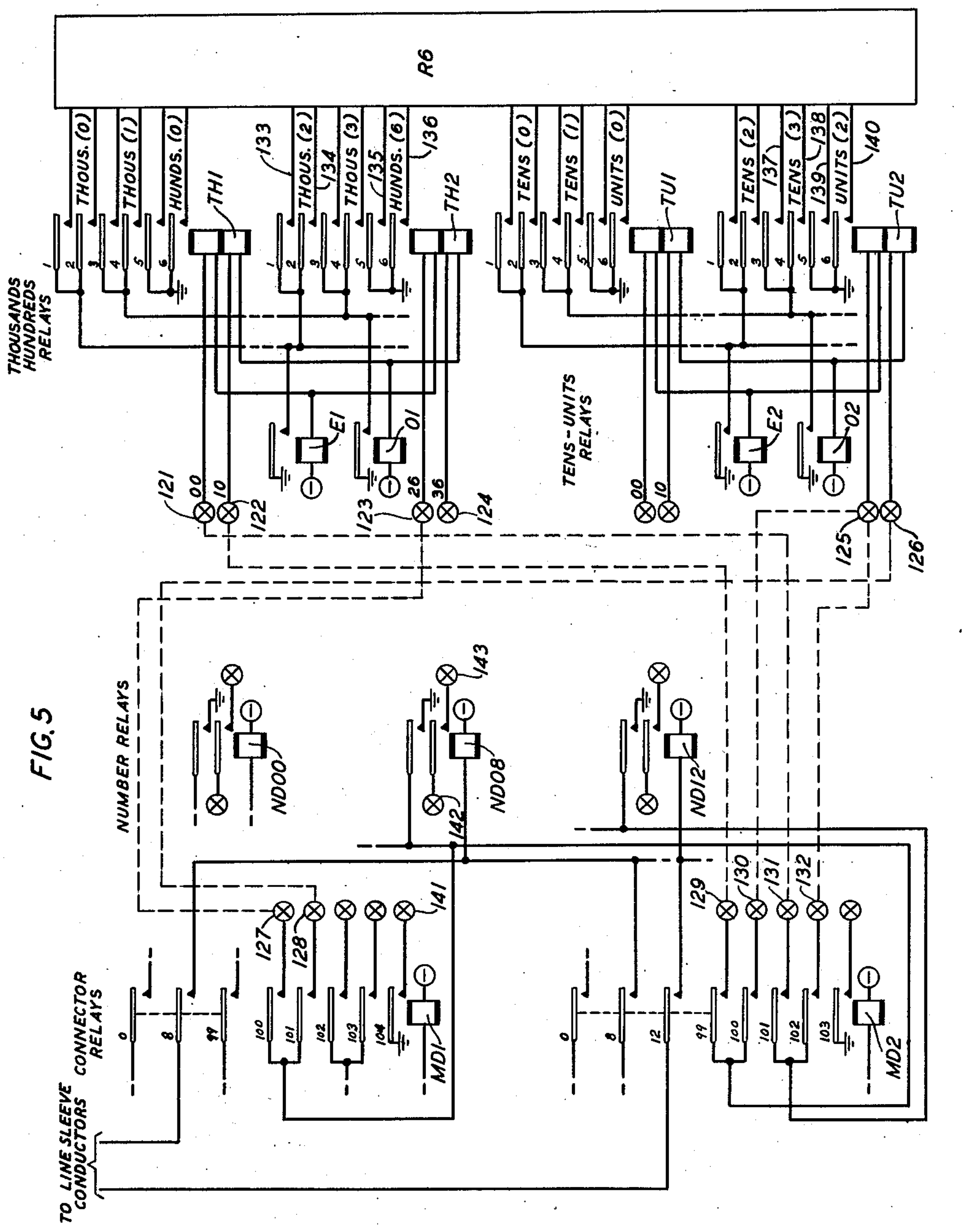
Fig. 5 shows circuits, applicable to either of the systems of Fig. 1 or Fig. 3, for translating the identifications of calling lines into the directory numbers of said lines.

While each of the systems described above identifies calling lines, it is necessary, for billing purposes, to determine from said identifications, the directory numbers of the identified lines. Fig. 5 discloses a means whereby the directory numbers of identified lines may be automatically registered and which is applicable to either of the systems described above. Relays MD1 and MD2 are connector relays corresponding to relays MC1 and MC2 of Fig. 1 or relays ML1 and ML2 of Fig. 3. Relays ND00, ND08 and ND12 are number relays similar to relays N00, N08 and N12 of Fig. 2 or relays NL00, NL08 and NL12 of Fig. 4. These relays operate in the same manner as the corresponding relays already described. In the application of this plan to systems using line switches, two or more connector relays must be provided for each group in which there are two or more lines connected to line switches having the same number, so that two line switches with the same number are not associated with any one connector relay. As previously mentioned, this is readily done. In practice, it is convenient to provide one connector relay for each twenty-five consecutively-numbered line switches.

For each of the pairs of combinations of thousands and hundreds digits of directory numbers that can be formed of two consecutive thousands digits with one hundreds digit, a double-wound relay, TH1 or TH2, is provided. Relay TH1 is the relay for the digit combination "00" and "10." Relay TH2 is the relay for digit combinations "26" and "36." A similar relay, TU1 or TU2, is provided for each of the similarly found combinations of tens and units digits of directory numbers. Relay TU1 is the relay for the tens-units digit combinations "00" and "10" while relay TU2 is the relay for the digit combinations "22" and "32." Contacts of all of said relays are connected to a suitable register R6 which may be similar to register R1 or register R3 and may operate in the same manner. Associated with the thousands-hundreds relays TH1, TH2, etc., is a relay E1 for indicating even thousands digits and a similar relay O1 for indicating odd thousands digits. The winding of each of said relays is connected to one end of a winding of each of the thousands-hundreds relays and the other ends of the windings of the thousands-hundreds relays are brought out to terminals, such as terminals 121, 122, 123 and 124, for cross-connection. Relays E2 and O2 are similarly associated with the tens-units relays TU1, TU2, etc.

Additional contacts are provided on the connector relays which are connected to contacts of the number relays and to terminals for cross-connection. Two such terminals are provided for each line and are cross-connected to terminals of the thousands-hundreds and tens-units relays in accordance with the directory number of said line. For example, terminals 127 and 128 are provided for the line connected to line switch No. 08 or line finder terminal No. 08 in the group or bank served by relay MD1, as indicated by the association of said terminals with relay ND08. Assuming that said line has the directory number "2632," then terminal 127 is connected to terminal 123 for the thousands-hundreds digit combination "26" and terminal 128 is connected to terminal 126 for the tens-units digit combination "32." Similarly, assuming that the directory number of the line connected to line switch No. 08 or line finder terminals No. 08 in the group or bank served by relay MD2 is "1022," then terminal 129 is connected to terminal 122 for the thousands-hundreds digit combination "10" and terminal 130 is connected to terminal 125 for the tens-units combination "22," terminals 129 and 130 being the terminals of relay MD2 which are associated with relay ND08. In like manner, if the directory number of the line connected to line switch No. 12 or line finder terminals No. 12 in the group or bank served by relay MD2 is "0022," then terminal 131 is connected to terminal 121 for the thousands-hundreds digit combination "00" and terminal 132 is connected to terminal 125 for the tens-units digit combination "22."

When a call is originated by the line connected to line switch No. 08 or line finder terminal No. 08 in the group or bank served by relay MD1, and said relay and relay ND08 operate in the manner previously described, a circuit is completed from battery through the winding of relay E1, upper winding of relay TH2, the cross-connection between terminal 123 and terminal 127, No. 100 contacts of relay MD1, and upper contacts of relay ND08 to ground, over which relays E1 and TH2 operate. Conductors 133 and 134 to register R6 are thereby grounded through No. 1 and No. 2 contacts of relay TH2 and contacts of relay E1, causing said register to register the thousands digit "2." Conductors 135 and 136 are also grounded by the operation of relay TH2, causing register R6 to register the hundreds digit "6." A circuit is also completed from battery through the winding of relay O2, lower winding of relay TU2, the cross-connection between terminals 126 and 128, No. 101 contacts of relay MD1, and upper contacts of relay ND08 to ground, over which relays O2 and TU2 operate. Conductors 137 and 138 are thereby grounded through No. 3 and No. 4 contacts of relay TU2 and contacts of relay O2 and conductors 139 and 140 are grounded through No. 5 and No. 6 contacts of relay TU2, causing register R6 to register the the tens digit "3" and the units digit "2." The number "2632," which is the directory number of the calling line, is therefore registered. The directory numbers of other calling lines are successively registered in the same manner.

Terminals of the connector relays such as terminal 141, and of the number relays, such as terminals 142 and 143, may be connected to one another and to terminal 86 (Fig. 1) or terminal 120 (Fig. 3) for the omission of recording on calls from certain lines or certain groups of lines in the manner previously described.

What is claimed is:

1. In a telephone system, in combination with a plurality of lines divided into groups, a trunk, means having an identifying designation for extending one of said lines to said trunk, means responsive to the operation of said line-extending means for applying direct current to said line, means responsive to said current, and means responsive to the operation of said current-responsive means for indicating the group of which said line is a part and the designation of said line-extending means to identify said line.

2. In a telephone system, in combination with a plurality of lines divided into groups and each line connected to a terminal having an identifying designation, a trunk, means for extending one of said lines to said trunk, means responsive to the operation of said line-extending means for applying direct current to said line, means responsive to said current, and means responsive to the operation of said current-responsive means for indicating the group of which said line is a part and the designation of the terminal of said line to identify said line.

3. In a telephone system, in combination with a plurality of lines divided into groups, a trunk, means having an identifying designation for extending one of said lines when calling to said trunk, means responsive to the operation of said line-extending means for indicating the group of which said calling line is a part, means responsive to said line-extending means for applying direct current to said calling line, means responsive to said current, and means responsive to the operation of said current-responsive means for indicating the designation of said line-extending means to identify said calling line.

4. In a telephone system, in combination with a line having an identifying designation, a trunk, means for extending said line to said trunk, means responsive to the operation of said line-extending means for applying direct current to said line, means responsive to said current, and means responsive to the operation of said current-responsive means for indicating the designation of said line.

5. In a telephone system, in combination with a plurality of lines divided into groups and each line having an identifying designation, a trunk, means having an identifying designation for extending one of said lines to said trunk, means responsive to the operation of said line-extending means for applying direct current to said line, means responsive to said current, means responsive to the operation of said current-responsive means for indicating the group of which said line is a part and the designation of said line-extending means, and means for translating said indications to the designation of said line.

6. In a telephone system, in combination with a plurality of lines divided into groups and each line having an identifying designation, each of said lines being connected to a terminal having an identifying designation, a trunk, means for extending one of said lines to said trunk, means responsive to the operation of said line-extending means for indicating the group of which said line is a part, means responsive to said line-extending means for applying direct current to said line, means responsive to said current, means responsive to the operation of said current-responsive means for indicating the designation of the terminal of said line, and means responsive to the operation of said last-mentioned means for translating said group and terminal indications into the designation of said line.

7. In a telephone system having means for actuating call recorders, the combination with a line, a trunk, and means for extending said line to said trunk, of means responsive to the operation of said line-extending means for applying direct current to said line, means responsive to said current, means responsive to the operation of said current-responsive means for identifying said line, and means responsive to the operation of said identifying means for rendering said recorder-actuating means ineffective.

8. In a telephone system having means for actuating call recorders, the combination with a plurality of lines divided into groups and each line having an identifying designation, a trunk, means having an identifying designation for extending one of said lines to said trunk, of means responsive to the operation of said line-extending means, means responsive to the operation of said last-mentioned means for indicating the group of which said line is a part and the designation of said line-extending means, means for translating said indications into the designation of said line, and means responsive to said translating means for rendering said recorder-actuating means ineffective.

9. In a telephone system, in combination with line finders in groups having individual designations and each having a plurality of banks of terminals, a line connected to terminals in one bank of one of said line finders, means for extending said line from said terminals, means responsive to the operation of said line extending means for indicating the bank in which said terminals are located and the designation of the group of which said line finder is a part, means responsive to said line extending means for applying direct current to said line, means responsive to said current, and means responsive to the operation of said current-responsive means for indicating the location of said terminals in said bank.

10. In a telephone system, in combination with a line switch, a line connected thereto and having an identifying designation, means for extending said line from said line switch, means operative subsequent to the operation of said line-extending means, means responsive to the operation of said last-mentioned means for indicating the location of said line switch, and means responsive to the operation of said indicating means for translating said indication into the designation of said line.

11. In a telephone system, in combination with a primary line switch, a line connected thereto and having an identifying designation, a trunk, a secondary line switch for extending said line to said trunk, means operative subsequent to the operation of said secondary line switch, means responsive to the operation of said last-mentioned means for indicating the location of said primary line switch, and means responsive to the operation of said indicating means for translating said indication into the designation of said line.

12. In a telephone system, in combination with line switches in groups having individual designations, a line connected to one of said line switches and having an identifying designation, a trunk, means for extending said line from said line switch to said trunk, means in said trunk operative subsequent to the operation of said line-extending means, means responsive to the operation of said last-mentioned means for indicating the group of which said line switch is a part and the location of said line switch in said group, and means responsive to the operation of said indicating means for translating said indications into the designation of said line.

13. In a telephone system, in combination with line finders in groups having individual designations, a line connected to terminals of one of said line finders and having an identifying designation, means for extending said line from said terminals, means responsive to said line-extending means for indicating the group of which said line finder is a part, means responsive to the operation of said line extending means for applying direct current to said line, means responsive to said current, means responsive to the operation of said current-responsive means for indicating the location of said terminals in said line finder, and means responsive to the operation of said indicating means for translating said indications into the designation of said line.

14. In a telephone system having means for actuating call recorders, the combination with a line switch, a line connected thereto, and means for extending said line from said line switch, of means responsive to the operation of said line-extending means, means responsive to the operation of said last-mentioned means for indicating the location of said line switch, and means responsive to the operation of said indicating means for rendering said recorder-actuating means ineffective.

15. In a telephone system having means for actuating call recorders, the combination with a line finder, a line connected to terminals thereof, and means for extending said line from said terminals, of means responsive to the operation of said line-extending means, means responsive to the operation of said last-mentioned means for indicating the location of said terminals, and means responsive to the operation of said indicating means for rendering said recorder-actuating means ineffective.

16. In a telephone system, in combination, primary line switches mounted in bays having individual designations, a line connected to one of said primary line switches, a trunk, a secondary line switch for extending said line from said primary line switch to said trunk, a connector relay, means in said trunk effective subsequent to the operation of said secondary line switch for operating said connector relay, bay relays responsive to said operated connector relay to indicate the bay in which said primary line switch is mounted, and number relays responsive to said operated connector relay to indicate the location of said primary line switch in said bay.

17. In a telephone system, in combination, line finders in groups having individual designations, a line connected to terminals of one of said line finders, means for extending said line from said terminals, a connector relay, means effective subsequent to the operation of said line extending means for operating said connector relay, group relays responsive to said operated connector relay to indicate the designation of the group of which said line finder is a part, and number relays responsive to said operated connector relay to indicate the location of said terminals in said line finder.

18. In a telephone system, in combination, line finders in groups having individual designations and each having a plurality of banks of terminals, a line connected to terminals in one bank of one of said line finders, means for extending said line from said terminals, a connector relay, means effective subsequent to the operation of said line extending means for operating said connector relay, group relays responsive to said operated connector relay to indicate the designation of the group of which said line finder is a part, a bank relay responsive to said line finder to indicate the bank in which the terminals of said line are located, and number relays responsive to said operated connector relay to indicate the location of said terminals in said bank.

19. In a telephone system, in combination, a primary line switch, a line connected thereto and having an identifying designation, a trunk, a secondary line switch for extending said line to said trunk, a connector relay, means effective subsequent to the operation of said secondary line switch for operating said connector relay, number relays responsive to said operated connector relay to indicate the location of said primary line switch, and translator relays responsive to said operated number relays for translating the indication of said location into the designation of said line.

20. In a telephone system, in combination, a line finder, a line connected to terminals thereof and having an identifying designation, means for extending said line from said terminals, a connector relay, means effective subsequent to the operation of said line extending means for operating said connector relay, number relays responsive to said operated connector relay to indicate the location of said terminals, and translator relays responsive to said operated number relays for translating the indication of said location into the designation of said line.

21. In a telephone system having means for actuating call recorders, the combination of primary line switches mounted in bays having individual designations, a line connected to one of said primary line switches, a trunk, a secondary line switch for extending said line from said primary line switch to said trunk, a connector relay, means in said trunk effective subsequent to the operation of said secondary line switch for operating said connector relay, bay relays responsive to said operated connector relay to indicate the designation of the bay in which said primary line switch is mounted, number relays responsive to said operated connector relay to indicate the location of said primary line switch in said bay, and means responsive to said operated connector relay, to said bay relays, and to said number relays for rendering said recorder-actuating means ineffective.

22. In a telephone system having means for actuating call recorders, the combination of line finders arranged in groups having individual designations, a line connected to terminals of one of said line finders, means for extending said line from said terminals, a connector relay, means effective subsequent to the operation of said line extending means for operating said connector relay, group relays responsive to said operated connector relay to indicate the group of which said line finder is a part, number relays responsive to said operated connector relay to indicate the location of said terminals in said line finder, and means responsive to said operated group relays and to said number relays for rendering said recorder-actuating means ineffective.

23. A telephone system comprising in combination line switches arranged in groups, lines connected to said switches, means for extending said lines from said switches, means for indicating the location of any of said switches and the group in which said switch is located, means effective subsequent to the operation of said line-extending means for operating said last-mentioned means, thereby to indicate the location of the switch connected to the calling line and the group in which said switch is located, means for actuating a call recorder, and alterable means responsive to the operation of said indicating means for selectably rendering said recorder-actuating means ineffective in accordance with the switch location indicated or in accordance with the switch group indicated.

24. A telephone system comprising in combination line finders, lines connected to terminals of said line finders, means for extending said lines from said terminals, for indicating the location of any of said terminals and the line finder in which said terminals are located, means effective subsequent to the operating of said line-extending means for operating said last-mentioned means, thereby to indicate the terminals to which said calling line is connected and the line finder in which said terminals are located, means for actuating a call recorder, and alterable means responsive to the operation of said indicating means for selectably rendering said recorder-actuating means ineffective in accordance with the location indicated or in accordance with the line finder indicated.

25. A telephone system comprising in combination calling lines each having an individual designation, means for indicating the designation of any one of said lines, means responsive to one of said lines when calling for operating said last-mentioned means, thereby to indicate the designation of said calling line, means for actuating a call recorder, and means responsive to the operation of said indicating means for selectably rendering said recorder-actuating means ineffective in accordance with the designation indicated.

RALPH E. HERSEY.

REFERENCES CITED

The following references are of record in the file of this patent:

UNITED STATES PATENTS

| Number | Name | Date |
|---|---|---|
| 2,277,802 | Thies et al. | Mar. 31, 1942 |
| 2,284,870 | Holden et al. | June 2, 1942 |
| 2,289,939 | Stehlik | July 14, 1942 |
| 2,300,829 | Gooderman | Nov. 3, 1942 |
| 2,370,736 | Kittredge | Mar. 6, 1945 |
| 2,385,228 | Ostline | Sept. 18, 1945 |
| 2,402,700 | Williams | June 25, 1946 |
| 2,440,277 | Kuritof et al. | Apr. 27, 1948 |
| 2,484,612 | Dehn et al. | Oct. 11, 1949 |